United States Patent [19]

Brundisini

[11] Patent Number: 4,937,746

[45] Date of Patent: Jun. 26, 1990

[54] IRRIGATION CONTROLLER INCLUDING MEANS TO IDENTIFY PARAMETER VALUE GROUPS TO BE DISPLAYED

[75] Inventor: Andrea Brundisini, Dana Point, Calif.

[73] Assignee: James Hardie Irrigation, Inc., Laguna Niguel, Calif.

[21] Appl. No.: 110,324

[22] Filed: Oct. 20, 1987

[51] Int. Cl.⁵ .................. B05B 12/04; G06F 15/46
[52] U.S. Cl. ......................... 364/420; 137/624.1; 239/69
[58] Field of Search ............... 304/420, 400, 146; 239/69; 137/78.3, 624.11; D13/12, 32, 35

[56] References Cited

U.S. PATENT DOCUMENTS

| | | | |
|---|---|---|---|
| 3,400,891 | 7/1966 | Mattwell | 364/145 |
| 4,015,366 | 4/1977 | Hall | 364/420 |
| 4,176,395 | 11/1979 | Evelyn-Veere | 364/420 |
| 4,189,776 | 2/1979 | Kendall | 364/145 |
| 4,190,884 | 2/1980 | Medina | 364/145 |
| 4,193,120 | 3/1980 | Yello | 364/145 |
| 4,209,131 | 6/1980 | Barash | 364/420 |
| 4,244,022 | 1/1981 | Kendall | 364/145 |
| 4,567,563 | 1/1986 | Hirsch | 364/400 |
| 4,569,020 | 2/1986 | Snoddy et al. | 364/145 |
| 4,646,224 | 2/1987 | Randsburg et al. | 364/143 |
| 4,755,942 | 7/1988 | Gardner | 364/420 |
| 4,760,547 | 7/1988 | Duxbury | 364/420 |

OTHER PUBLICATIONS

"Paragon EC700 Programmable Time Controller", Bulletin 2070, Oct. 1979.

1987 Landscape and Turf Catalog, L. R. Nelson Corporation, cover page, back page, and pp. 20–25.
Turf Irrigation Catalog, James Hardie Irrigation, cover page, back page, and pp. 2, 37–39.
Irri-Trol Irrigation Controllers and Specification Catalog 1987, cover page, back page, and pp. 3–11, 17, and 25.

Primary Examiner—Michael R. Fleming
Assistant Examiner—Gail O. Hayes
Attorney, Agent, or Firm—Gordon L. Peterson; Loyal M. Hanson

[57] ABSTRACT

An irrigation controller includes a microprocessor for controlling a plurality of watering stations under program control according to a plurality of stored parameter values, a display module operationally connected to the microprocessor means for displaying the parameter values, and a plurality of selector switches initiating the display of a selected one of a plurality of predefined groups of the parameter values. Each one of the switches corresponds to a respective one of the groups, and the display module includes both a first plurality of display elements configured to produce images of the parameter values and a second plurality of display elements configured to produce images identifying the selected group. One embodiment includes a liquid crystal display having the second plurality of display elements configured as arrowheads pointing toward panel labeling that extends to a corresponding one of the switches.

15 Claims, 5 Drawing Sheets

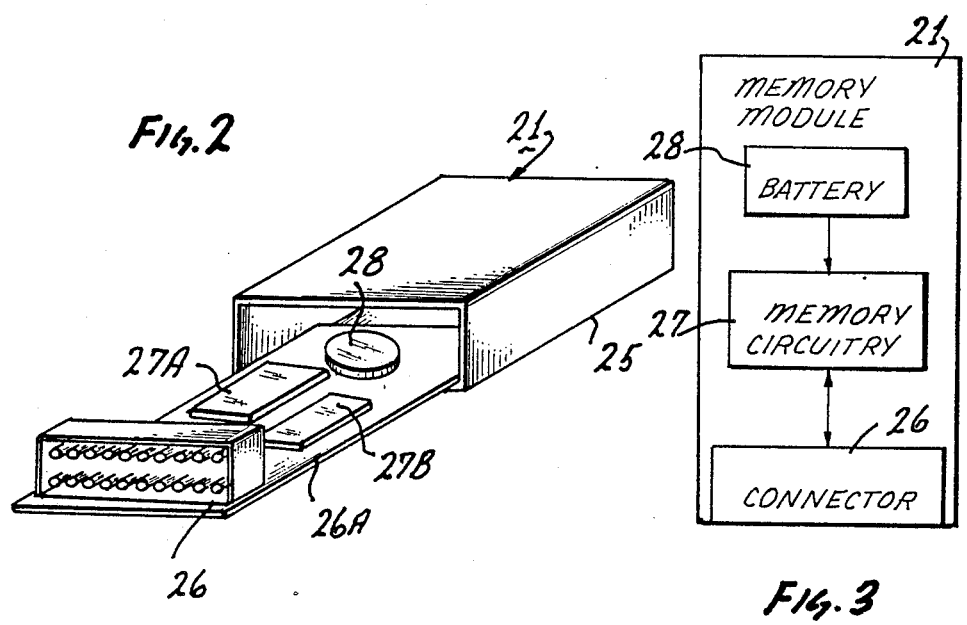
Fig. 2
Fig. 3
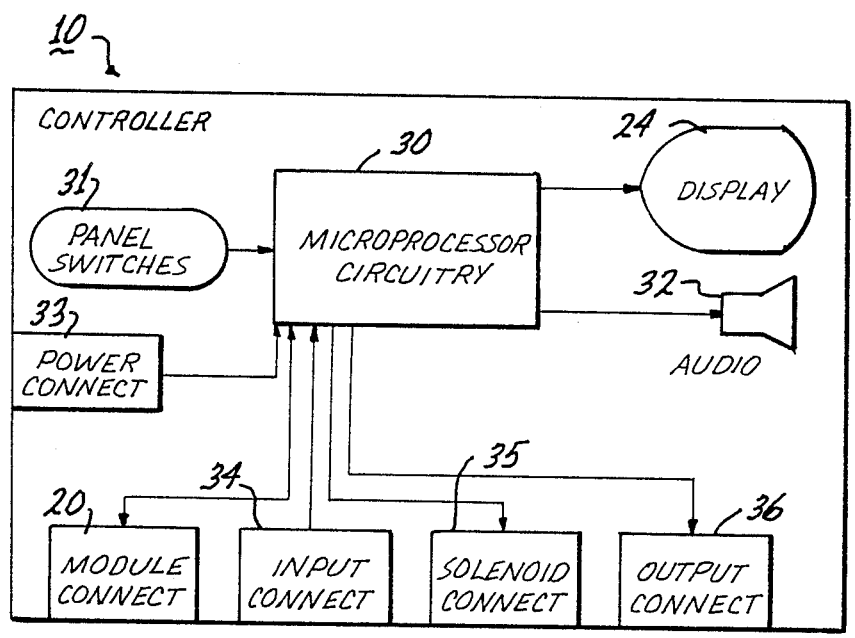
Fig. 4

IRRIGATION CONTROLLER INCLUDING MEANS TO IDENTIFY PARAMETER VALUE GROUPS TO BE DISPLAYED

CROSS REFERENCE TO RELATED APPLICATION

This application is related to copending and commonly assigned U.S. patent application Ser. No. 110,665 entitled "Irrigation Controller" having the same filing date and naming the same inventor as this application.

BACKGROUND OF THE INVENTION

Technical Field

The invention relates generally to irrigation controllers providing microprocessor control of watering stations, and more particularly to a new and improved display arrangement for such a controller.

BACKGROUND INFORMATION

The display on an irrigation controller enables a user to interact with the controller for programming purposes. It displays alphanumeric character strings related to various watering schedule parameters so they can be monitored and changed as desired. This is sometimes done by manipulating various front panel controls while viewing the display, and in order to facilitate this process, the display and front panel controls must be carefully arranged.

By way of background, such controllers are used to provide centralized control of watering stations located at remote sites over the field to be irrigated. The controller may include electrical circuitry housed within a stand-alone unit suited for installation at a conveniently accessible outdoor location in or adjacent the field. There, it functions to activate the stations according to a desired watering schedule to provide more effective and convenient irrigation, as well as better water conservation.

Some controllers accomplish the above under microprocessor control. Once preprogrammed with various parameter values, such as the start time, duration, and repetition rate desired for each station, the microprocessor produces control signals that are used to activate solenoid valves at the watering stations. This causes water to flow at each station on schedule with microprocessor accuracy and dependably, while allowing the user great flexibility in prescribing the exact watering schedule desired.

The parameter values are preprogrammed by the user, and this is sometimes done with a series of switches on the controller front panel. The switches may be arranged in a keypad configuration, for example, and the user depresses the keys in a certain sequence that results in the desired parameter values being entered. The sequence sometimes includes depressing a key in order to select a specific group of the parameter values to be programmed, such as the group of parameter values related to a particular watering station, and this requirement results in certain problems that need to be overcome.

For example, the user must recall what keys to actuate to select a desired group of the parameter values, and once the appropriate keys are actuated, the user must remember the group selected. This may seem easy enough, but in the context of programming a controller having multiple watering stations and multiple programming functions that each correspond to a different group of parameters values, errors sometimes occur.

Thus, it is desirable to have an arrangement that overcomes this concern.

Although identifying labels adjacent to indicator lamps on the front panel would serve to identify the group selected, this arrangement increases controller size, cost, and power requirements. In addition, the lamps may fail periodically. Thus, this technique is not entirely satisfactory.

Some existing controllers, called hybrid controllers, utilize a rotary switch to provide feedback to the operator. Each position of the rotary switch corresponds to a separate group of parameter values, and each switch position is labeled. Thus, the user turns the rotary switch to the appropriate position, and there it remains to identify the group selected. Other controllers have multiple switches for this purpose of providing feedback.

However, these arrangements are somewhat inconvenient to operate in comparison to depressing a switch. In addition, the contacts of many rotary type switches are prone to corrosive and other damage in the environment common to many irrigation controller installations. Furthermore, the switches must be sufficiently large to be grasped by a user in the field, and this results in a bulkier panel arrangement than desired.

Consequently, it is desirable to have a better arrangement for selecting one of various groups of parameter values that features the convenience of a depressible switch while still identifying the group selected without the shortcomings of panel lamps.

SUMMARY OF THE INVENTION

This invention recognizes the problems associated with the prior art and provides an irrigation controller with the desired features.

Briefly, the above and further objects of the present invention are realized by providing a microprocessor-based controller having a display module with a uniquely configured pattern of display elements that produce images of the parameter values as well as images identifying the selected group.

The user need only actuate the appropriate switch to display both the parameter values and group identifying information. Thus, depressible switches may be used for a conveniently operated and pleasant appearing front panel arrangement that greatly facilitates operation.

Generally, an irrigation controller constructed according to the invention includes a microprocessor circuit for controlling a plurality of watering stations under program control according to a plurality of stored parameter values, and display components operationally connected to the microprocessor means for displaying the parameter values. The microprocessor circuitry may include one or more commercially available microcomputer chips memory, programming, and supporting circuitry arranged for connection to a solenoid valve at each of the watering stations.

The display module may be of the known liquid crystal type, although other types of display modules with a fixed pattern of display elements may be used instead. In the liquid crystal type, for example, a liquid crystal composition is disposed between thin, electrically conductive display elements and electrically conductive backplanes. These are supported by front and rear transparent panels, and an electric potential coupled to selected ones of the display elements and a corresponding ones of the backplanes creates an electric field across the composition that affects molecular orientation to produce visually discernible images having the shape of the selected display elements. This type of display is small, lightweight, and energy efficient, and particularly adaptable to a stand-alone controller that is to be located out of doors.

In addition to the display module and the microprocessor circuit, the controller includes a plurality of selector switches operationally connected to the microprocessor circuit. These are used to initiate the display of a selected one of a plurality of predefined groups of the parameter values, each one of the switches corresponding to a respective one of the groups. This may be done for monitoring and reprogramming purposes, and pairs of incrementing and decrementing switches may be provided to change the various values in the selected group of parameter values as they are displayed.

According to a major aspect of the invention, the display module includes a first plurality of display elements configured to produce images of the parameter values and a second plurality of display elements configured to produce images identifying the selected group. When one of the switches is actuated, the first plurality produces images of the parameter values and the second plurality produces images identifying the selected group.

In one form of the invention, the second plurality of display elements takes the form of arrowhead-shaped display elements disposed along a marginal edge portion of the display module, with each arrowhead pointing toward associated front panel labeling that identifies the selected group. This technique allows relatively large lettering without increasing display module size. In addition, the panel labeling may extend to the corresponding selector switch to serve as switch labeling also.

These and other objects and features of the invention and the manner of attaining them will become apparent, and the invention itself will be best understood, by reference to the following description taken in conjunction with the accompanying illustrative drawings.

BRIEF DESCRIPTION OF THE DRAWINGS

FIG. 2 is an enlarged perspective view of a memory module used for transferring remotely programmed parameter values to the controller, shown partially disassembled;

FIG. 3 is a schematic block diagram of the memory module circuitry;

FIG. 4 is a schematic block diagram of the controller circuitry;

DESCRIPTION OF THE PREFERRED EMBODIMENTS

Figure 1:
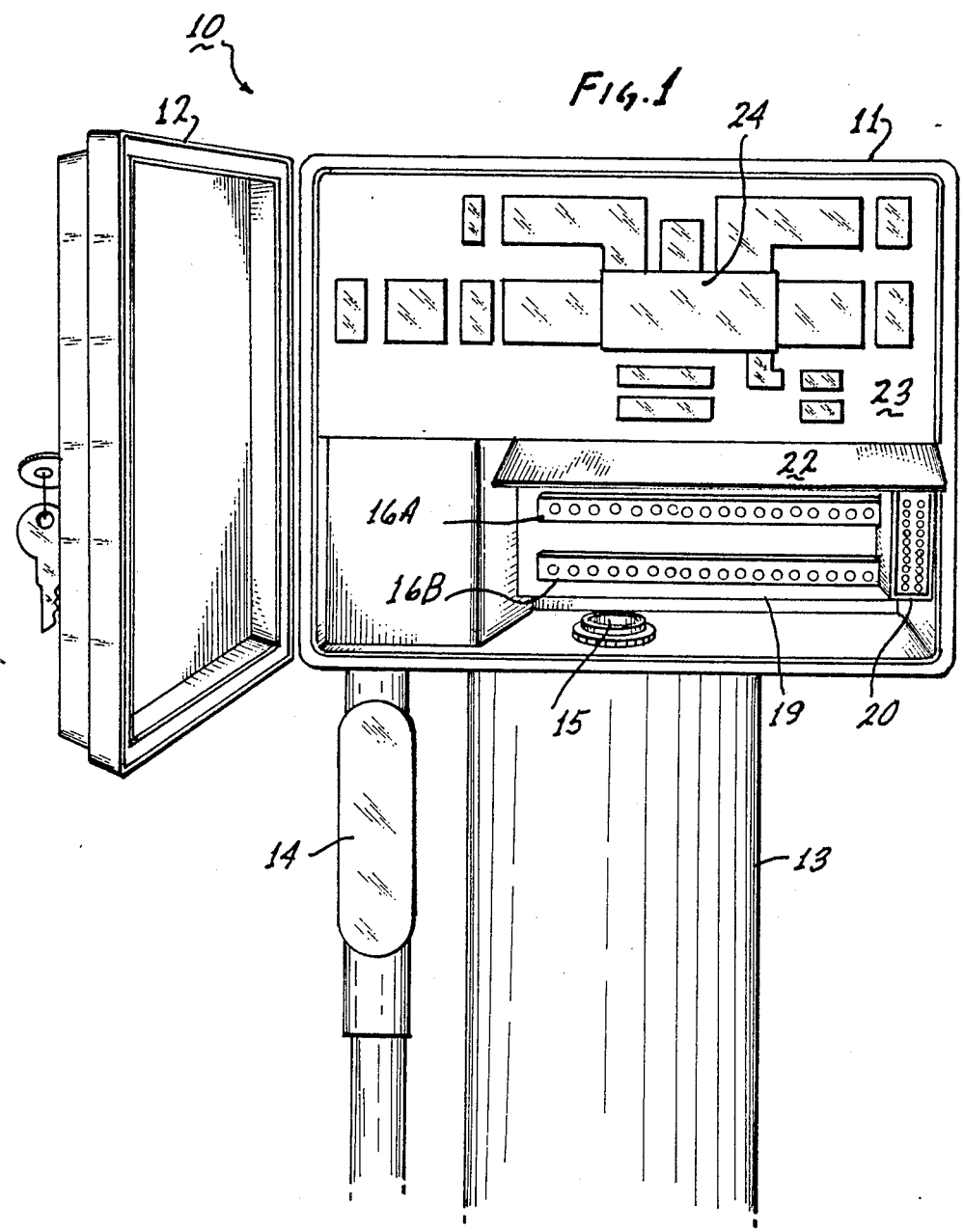
FIG. 1 of the drawings is a perspective view of an irrigation controller constructed according to the invention.

Referring now to FIG. 1 of the drawings, there is shown an irrigation controller 10 constructed according to the invention. Generally, the controller 10 includes a box 11 with a lockable lid 12 that seals the interior from the elements and unauthorized access, and it is mounted on a suitable support structure, such as a wall or a pedestal 13 that may be located adjacent a field to be irrigated.

Wires from a separate electrical power source (not shown) are routed through a conduit 14 to the controller 10, and wires from solenoid valves at each of the watering stations in the the field (not shown) are routed through an entrance 15 to connectors 16A and 16B mounted on a connector panel 19 within the interior of the box 11. These couple control signals from the controller 10 to the solenoid valves in order to actuate them.

The connectors 16A and 16B are also utilized to couple input signals to the controller 10, such as those from a soil sensor, for example, or other auxiliary input devices. In addition, a memory module connector 20 is provided on the connector panel 19, and this is used in conjunction with a memory module 21 (subsequently described with reference to FIG. 2) to enable a user to transfer remotely programmed parameter values to and from the controller 10. A connector panel cover 22 operates to cover this portion of the controller 10.

The controller 10 also includes a control panel 23 on which is mounted a uniquely configured display module 24. The display module 24 operates in conjunction with various control panel switches and labeling indicia (subsequently described with reference to FIGS. 5 and 6) to greatly facilitate controller operation.

Although the memory module 21 is described more fully in the copending application mentioned above, it is worthwhile to review some details for added insight. Generally, it includes a housing 25 that is dimensioned and arranged to enable a user to transport the module by hand (FIG. 2). In other words, it can be held in the hand, and as an idea of size, the illustrated housing 25 is in the form of a box approximately nine centimeters long and thirteen centimeters in girth. A connector 26 is mounted on a circuit board 26A that mounts conventionally within the housing 25, and this connector mates with the connector 20 on the connector panel 19 (FIG. 1).

In this regard, the connector 26 and circuit board 26A are shown in FIG. 2 in a partially disassembled position for illustrative convenience. It may take the form of a twenty-pin connector, and once the connector 26 and the circuit board 26A are secured within the housing 25, the memory module 21 can be plugged into the memory module connector 20 on controller 10 in order to transfer parameter values from the module 21 to the controller.

The module 21 includes an electronic memory circuitry 27 (FIG. 3) for storing a remotely programmed set of the parameter values. This circuitry may include a commercially available memory module 27A, such as a 8K×8-bit static RAM, low-power, CMOS memory, and a latch 27B, such as a commercially available eight-bit latch (FIG. 2). These are interconnected with the connector 26, utilizing known components and design techniques, to store digital data representing the parameter values.

The memory circuitry 27 is powered by a battery 28, and it is coupled to the connector 26 (FIG. 3). The user preprograms the module 21 by plugging it into a programming device designed for this purposes. This might be another controller similar to the controller 10 that is maintained at the office for programming purposes. Once preprogrammed, the module 21 is transported to the controller 10 where it is plugged into the connector 20 to transfer the preprogrammed parameter values to the controller 10. Transfer may be accomplished automatically under program control by sensing for the presence of the module 21, or it may be operator-initiated by various means, such as the depression of one or more switches on the control panel 23. The information on the controleer can also be stored on the memory module to be analyzed in the office.

As shown in schematic block diagram form in FIG. 4, the circuitry employed in the controller 10 includes microprocessor circuitry 30. This may include one or more microprocessor chips, memory, power supply components, a battery backup connector, and related supporting circuitry that use suitable known components, design techniques, and programming to accomplish the functions described. So configured, it serves as microprocessor means for controlling a plurality of watering stations under program control according to a plurality of stored parameter values.

The display module 24 mentioned previously with reference to FIG. 1, and a series of panel switches 31 (FIG. 4) are operationally connected to the microprocessor circuitry 30 to enable the display and change of the parameter values by actuating appropriate ones of the panel switches 31. These are subsequently described in further detail with reference to FIG. 6 where they are individually designated by other reference numerals. In addition, an audio output device 32 is operationally connected to the microprocessor circuitry 30 for providing an audible output signal, and a power connector 33 is included for coupling the separate electrical power source to the microprocessor circuitry 30.

An input connector 34 couples input signals, such as a soil sensor signal or a remote control input signal, and an output connector 36 couples output signals, such as a main water valve control signal. These connectors may be terminals on the connectors 16A and 16B mentioned with reference to FIG. 1, as may be the solenoid connector 35 shown in FIG. 4 which couples control signals from the microprocessor circuitry to the solenoid valves.

Figure 5:
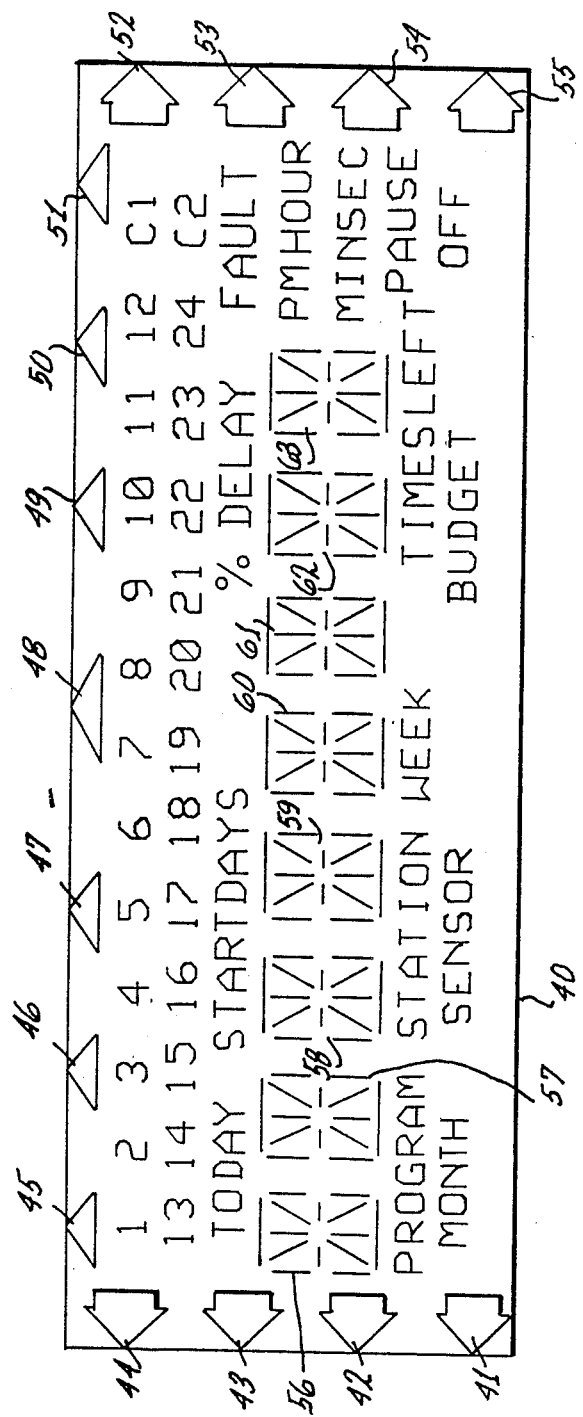
FIG. 5 is an enlarged view of the fixed pattern of display elements provided on the display module.

Focusing now on the display module 24, it utilizes a known type of display, such as the liquid crystal type, that is conventionally fabricated with a fixed pattern of display elements. This pattern is illustrated in FIG. 5 where there is shown a transparent panel 40 on which is disposed a plurality of display elements of various shapes. These include those forming the numerals one through twenty-four, the symbols "C1" and "C2", the various illustrated words, such as TODAY, PROGRAM, WEEK, etc., a percent sign, fifteen arrowheads 41-55, and a plurality of line segments arranged in eight, fourteen-segment alphanumeric display configurations 56-63.

Each of the display elements is fabricated according to known techniques to include a thin, electrically-conductive member in the shape of a desired image. These are conventionally supported in spaced apart relation to conductive back panels, with a liquid crystal composition in between. Individual ones of the display elements are energized or activated by impressing a potential across it and a corresponding one of the back planes. This is conventionally done with fine, electrically-conductive traces connected to the various conductive members and back planes, the conductive traces being coupled in turn to the microprocessor circuitry so that each display element can be activated separately under microprocessor control.

Thus, the display module 24 includes a first plurality of display elements configured to produce images of a selected group of parameter values. These are the display elements making up the alphanumeric display configurations 56-63. In addition, the display module 24 includes a second plurality of display elements configured to produce images for identifying the selected group. These are the arrowheads 41-55. They are disposed along a marginal edge portion 24A of the display module 24, and they are arrowhead shaped in the sense that they are triangularly-shaped with an apex oriented to point outwardly from the display module. Of course, other shapes may be used within the broader concept of this inventive aspect. Together, the elements 41-63 display both the parameter values and the group identifying information desired, thereby overcoming the previously mentioned problems of some existing controllers.

In addition, the display module 24 includes a third plurality of display elements configured to produce a plurality of labeling images to be used in displaying additional information related to the selected group of parameter values. These are the fixed numerals, words, and symbols. Each of the numerals one through twenty-four may be activated, for example, to indicate that the displayed parameter values relate to a watering station represented by that numeral.

Those of the third plurality of display elements forming the various words and symbols may be energized to identify the parameter values being displayed. Depending on which group is selected, for example, the alphanumeric configurations 56 and 57 may be used to display parameter values representing a date, a particular program symbol, or a designation of the watering schedule week. Thus, the appropriate one of the words "TODAY," "PROGRAM," and "WEEK" are activated to indicated which of these parameter values are being displayed. In addition, the controller 10 may be configured to recognize various "fault38 conditions, such as a short circuit, and activate the word "FAULT" when such a condition occurs.

Figure 6:
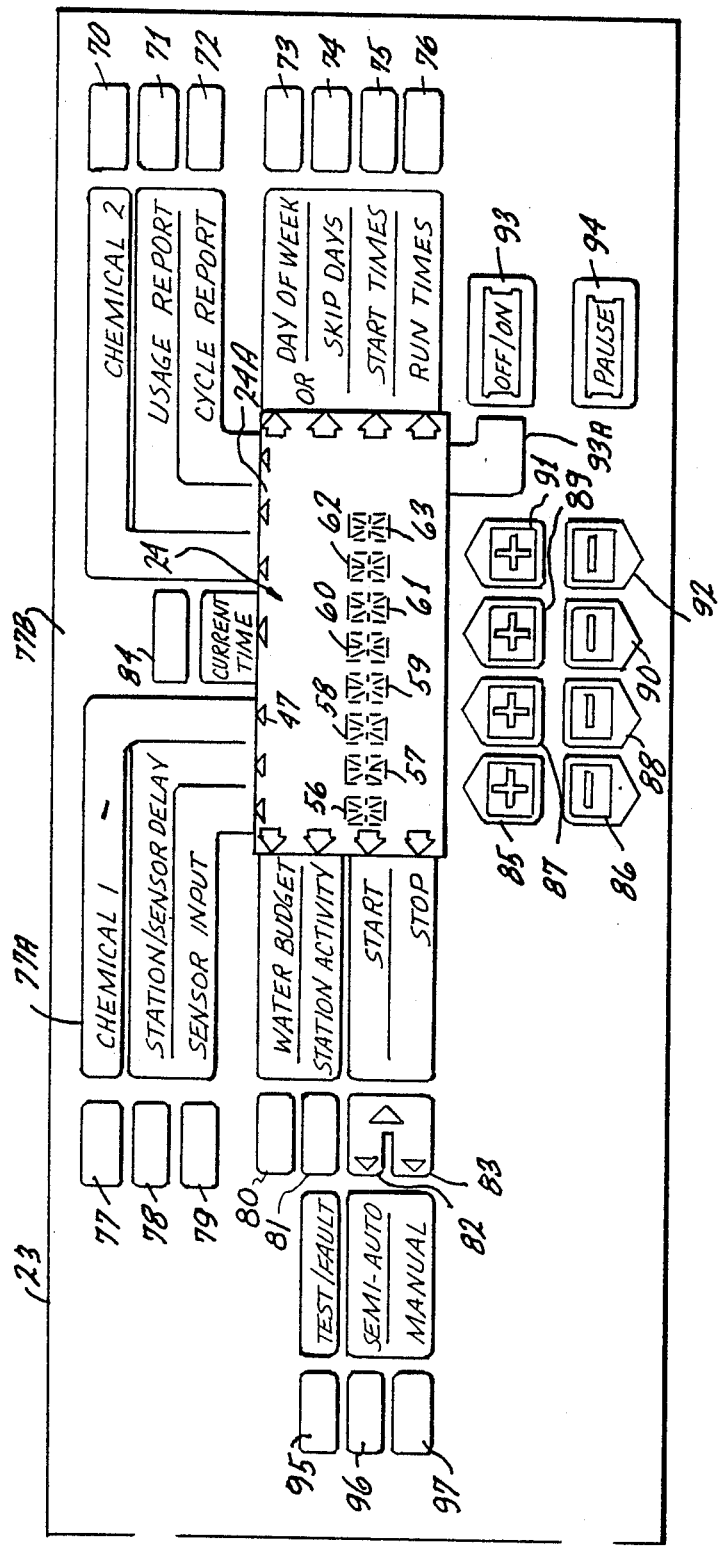
FIG. 6 is an enlarged view of the control panel layout, including the display module, switches, and labeling indicia.

The display module 24 is mounted on the panel 23, along with various labeling indicia and a complement of panel switches 70-97 (FIG. 6). The panel switches are of the conventional membrane type which are actuated when depressed, and this facilitates operation by a user having large, muscular hands and fingers that may be covered with soil and water. The user merely "points at" the appropriately labeled switch to actuate it (touches it with an extended finger), instead of manipulating a knob or multiple switches closely spaced in a keypad configuration. This also serves to minimize the transfer of soil and water from the user's hands and fingers to the control panel 23. In addition, the spaced-apart arrangement of the switches provides space for larger and more detailed labeling than possible with a keypad arrangement.

A first plurality of the panel switches, selector switches 70-81 and 84, serve as selector means for initiating the display of a selected one of a plurality of predefined groups of the parameter values. These switches are operationally connected to the microprocessor circuitry, and each one corresponds to a respective one of the groups of the parameter values, the respective group being indicated by a corresponding selector switch labeling indicia on the panel 23.

Selector switches 82 and 83 are also operationally connected to the microprocessor, but in the illustrated controller 10 they are used to start and stop certain controller operations. Otherwise, they are generally similar to the other selector switches. In this regard, the controller causes arrowheads 41 and 42 to flash on and off as a cue for the operator to depress one of the switches 82 and 83, although other operational schemes may be provided within the broader inventive concepts disclosed.

Each of the selector switch labeling indicia is similar in several respects, and only the one designated "CHEMICAL 1" is described in further it detail. The one designated "CHEMICAL 1" includes an indicator strip 77A on which the symbol "CHEMICAL 1" appears. It may be suitably affixed to the panel 23, such as by being painted on the panel or being part of a decal that is affixed to the panel 23, and it extends intermediate the selector switch 77 and the marginal edge portion 24A of the display module 24, adjacent to the arrowhead 47.

The illustrated strip 77A is approximately seven millimeters wide, and it is a color that contrasts with the panel background 77B, white on black, for example. Thus, it provides a visually discernible indication of the relationship between the arrowhead 47 and the selector switch 77. When the arrowhead 47 is activated, this means that the selector switch 77 has been actuated and the group of parameter values corresponding to selector switch 77 are being displayed.

In a similar manner, there is provided the illustrated selector switch labeling indicia for each of the selector switches 70-84. Each one of these indicia extends as illustrated in FIG. 6 intermediate a respective one of the selector switches 70-84 and a corresponding one of the arrowheads 41-55. In this regard, only the reference numeral for arrowhead 47 is included in FIG. 6, because the display module 24 is reduced in size significantly compared to the enlarged view in FIG. 5. Also, most of the third plurality of display elements are not illustrated in FIG. 6 for the same reason.

A second plurality of the panel switches, incrementing/decrementing switches 85-92, serve as parameter-changing means for enabling the user to change the value of selected ones of the selected group of parameter values as the group is displayed. These switches are operationally connected to the microprocessor circuitry, and they are arranged in pairs that includes an incrementing switch (labeled with a "+") and a decrementing switch (labeled with a "−").

A pair of these switches, switches 85 and 86, change the values displayed on alphanumeric configurations 56 and 57. Similarly, a pair of switches 87 and 88 changes the values displayed on the alphanumeric configurations 58 and 59, a pair of switches 89 and 90 changes the values displayed on the alphanumeric configurations 60 and 61, and a pair of switches 91 and 92 changes the values displayed on the alphanumeric configurations 62 and 63.

The panel switches 70-97 also include a series of control switches 93-97. Switch 93 turns the output to the solenoids off until pressed again, or for a programmable number of days up to thirty-one days, while switch 94 initiates a pause in controller operations. Certain ones of the third plurality of display elements produce images in the form of the words "PAUSE" and "OFF" to indicate that switches 93 and 94 have been actuated, and a labeling indicia 93A relates the switch 93 to the display of the word "OFF". Switches 95-97 initiate other controller functions, and they are provided with adjacent labeling indicia also, disposed near the selector switches 82 and 83 because their operation relates to those selector switches.

Thus, the invention provides a new and improved display and panel arrangement that greatly facilitates controller operation. Depressible selector switches and labeling indicia are utilized in conjunction with a uniquely configured display module that displays parameter values as well as images identifying the group of parameters selected. These components are arranged in a way particularly suited to irrigation controller requirements to enhance operation and appearance.

Although an exemplary embodiment of the invention has been shown and described, many changes, modifications, and substitutions may be made by one having ordinary skill in the art without necessarily departing from the spirit and scope of this invention.

What is claimed is:

1. An irrigation controller, comprising:
microprocessor means for controlling a plurality of watering stations under program control according to a plurality of parameter values; 'display means operationally connected to the microprocessor means for displaying the parameter values;
selector means for initiating the display of a selected one of a plurality of predefined groups of the parameter values, including a first plurality of randomly actuatable switches operationally connected to the microprocessor means, each one of the switches corresponding to a respective one of the groups;
the display means including a display module having a first plurality of display elements configured to produce images of the parameter values and a second plurality of display elements configured to produce images which point to the switches of the first plurality of switches, respectively, and which are usable in identifying the selected group; and
parameter-changing means for enabling the user to change the value of selected ones of the selected group of parameter values as the group is displayed, including a second plurality of randomly actuatable switches operationally connected to the microprocessor means.

2. A controller as recited in claim 1, further comprising:
a panel on which the display module and the first plurality of switches are mounted; and
a plurality of identifying indicia on the panel adjacent to the display module, each one of which indicia is disposed adjacent to a corresponding one of the second plurality of display elements.

3. A controller as recited in claim 2, wherein:
each one of the second plurality of display elements is disposed along a marginal edge portion of the display module; and
each one of the indicia extends to a position that is disposed alongside the marginal edge portion of the display module, adjacent to the corresponding one of the second plurality of display elements.

4. A controller as recited in claim 3, wherein:
each one of the indicia extends intermediate one of the second plurality of display elements and one of the first plurality of switches.

5. A controller as recited in claim 3, wherein:
each one of the second plurality of fixed display elements has a arrowhead-like shape arranged to point toward the corresponding one of the indicia.

6. A controller as recited in claim 1, wherein the display module includes:
   a third plurality of display elements configured to produce a plurality of labeling images useable in displaying information related to the selected group of parameter values.

7. A controller as recited in claim 6, wherein the third plurality of display elements includes:
   a first group configured to produce a plurality of images that each identify a respective one of the watering stations.

8. A controller as recited in claim 6, wherein the third plurality of display elements includes:
   a display element configured to produce an image indicating the occurrence of a fault condition.

9. A controller as recited in claim 1, wherein the display module includes:
   a liquid crystal display module with a fixed pattern of display elements.

10. A controller as recited in claim 1, wherein the second plurality of switches includes:
    incrementing switch means for incrementing selected ones of the selected group of parameter values; and
    decrementing switch means for decrementing selected ones of the selected group of parameter values.

11. A controller as recited in claim 10, wherein the first and second plurality of switches includes:
    membrane switches.

12. An irrigation controller comprising:
    microprocessor means for controlling a plurality of functions of watering stations under program control;
    display means operationally connected to the microprocessor means for displaying information related to the functions;
    selector means for selecting one of the functions and for initiating the display on said display means of information relating to the selected function, said selector means including a first plurality of randomly actuatable switches operationally connected to the microprocessor means and corresponding, respectively, to said functions;
    the display means including display module means for producing and displaying information related to the selected function and for producing and displaying images which point to the switches of the first plurality of switches, respectively, to associate the information displayed by said display means with the selected function; and
    a second plurality of randomly actuatable switches operationally connected to the microprocessor means for changing the information displayed by said display means.

13. A controller as recited in claim 12 wherein the display module means has a plurality of sides and the second plurality of switches are located along one of said sides and at least some of the first plurality of switches are located along another of said sides.

14. A controller as defined in claim 12 wherein the display module has a plurality of sides and the first plurality of switches are arranged along a plurality of said sides.

15. A controller as defined in claim 14 including a panel on which the display module and the first plurality of switches are mounted and a plurality of identifying indicia on the panel adjacent to the display module, said indicia extending intermediate the switches of the first plurality of switches and said images, respectively.

* * * * *